W. SHANNON.
MACHINE FOR CUTTING AND FORMING WIRE CLIPS.
APPLICATION FILED DEC. 19, 1910.

1,167,725.

Patented Jan. 11, 1916.
2 SHEETS—SHEET 1.

WITNESSES:
Harry W. Davis.
Katherine Arnett

Woodford Shannon INVENTOR.
BY
Popham & Webster
ATTORNEYS.

W. SHANNON.
MACHINE FOR CUTTING AND FORMING WIRE CLIPS.
APPLICATION FILED DEC. 19, 1910.
1,167,725.
Patented Jan. 11, 1916.
2 SHEETS—SHEET 2.
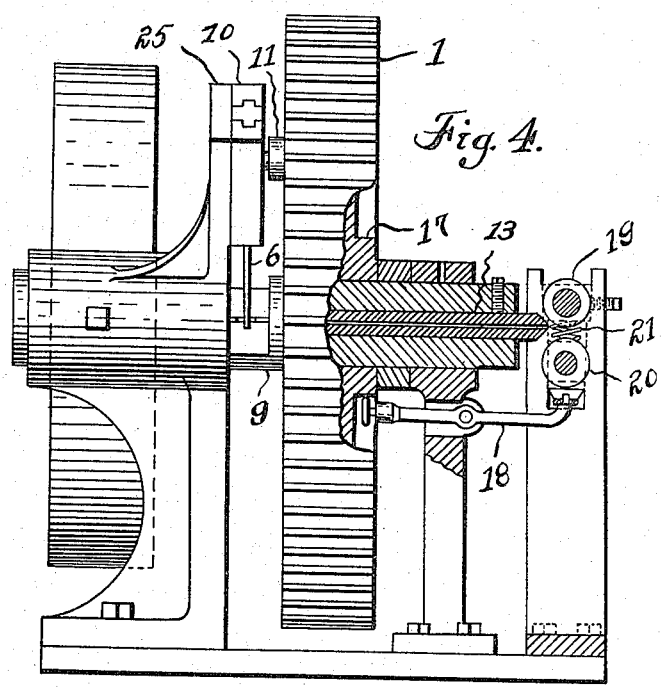
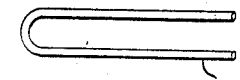
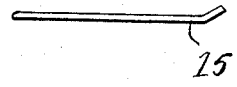
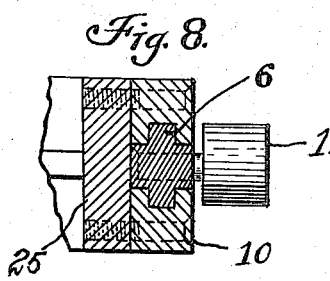
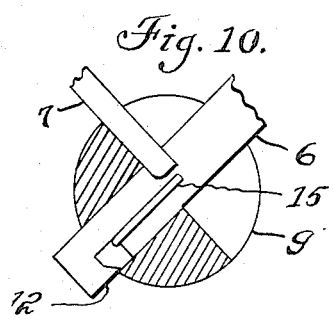
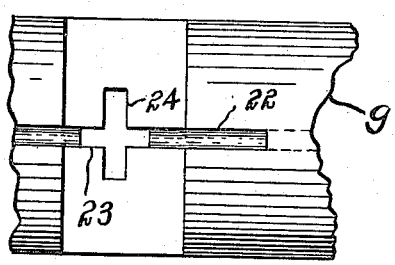
WITNESSES:
Harry W. Davis.
Katherine Arnett.
Woodford Shannon  INVENTOR.
BY
Popham & Webster  ATTORNEYS
COLUMBIA PLANOGRAPH CO., WASHINGTON, D. C.

UNITED STATES PATENT OFFICE.

WOODFORD SHANNON, OF LOUISVILLE, KENTUCKY.

MACHINE FOR CUTTING AND FORMING WIRE CLIPS.

1,167,725.  Specification of Letters Patent.  Patented Jan. 11, 1916.

Application filed December 19, 1910. Serial No. 598,025.

*To all whom it may concern:*

Be it known that I, WOODFORD SHANNON, a citizen of the United States, and a resident of Louisville, in the county of Jefferson and State of Kentucky, have invented a new and useful Machine for Cutting and Forming Wire Clips, of which the following is a full, clear, and exact description.

My invention effects the organization of the novel elements hereinafter described into a simple, compact, and efficient machine for the automatic manufacture of wire clips, disclosed by the drawings herewith, and is particularly susceptible of adaptation to the manufacture of staples.

A practical embodiment of the invention is represented in the accompanying drawings, forming a part of this specification, in which similar characters of reference indicate corresponding parts in all the views.

Figure 1:
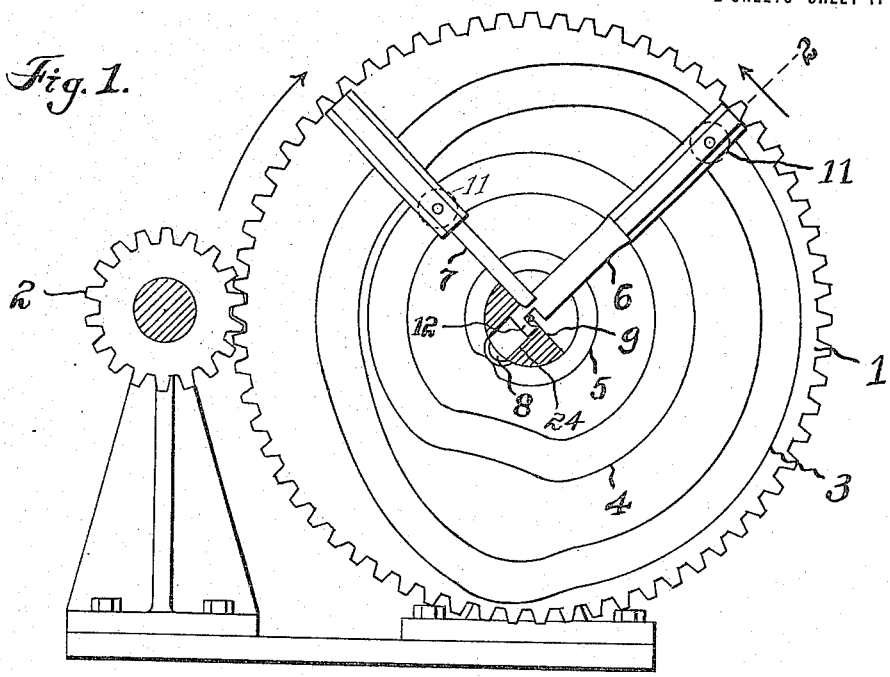
Figure 2:
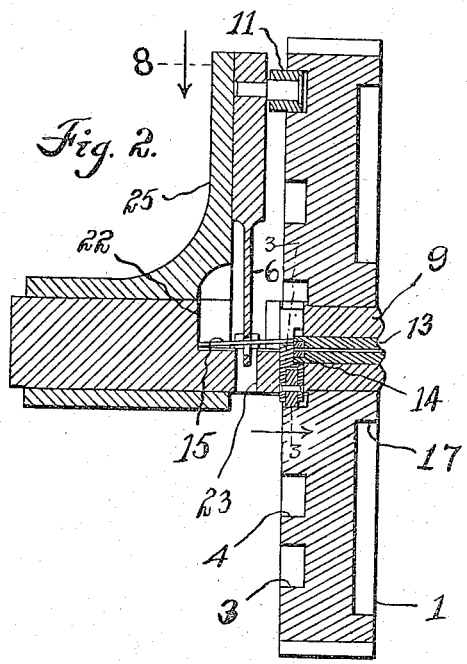
Figure 3:
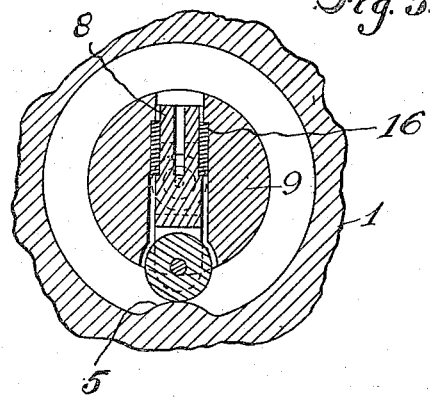

Figure 1 is an end elevation of the device, with the operating tools uncovered. Fig. 2 is a longitudinal section on the plane of the radius 2 in Fig. 1. Fig. 3 is an enlarged detail cross-section showing the cutting tool on line 3 of Fig. 2. Fig. 4 is a vertical longitudinal section, in part elevation, showing the feed mechanism. Fig. 5 is a detail of two of the tools. Figs. 6 and 7 are elevations of the finished product. Fig. 8 is a detail horizontal cross-section on the line 8 of Fig. 2. Fig. 9 is a detail plan of the bolster portion of the main shaft. And Figs. 10 and 11 are detail elevations of the coöperating tools.

As shown in the drawings, my invention is embodied in a machine for cutting off pieces of wire, bending them in two directions, and then discharging the pieces. These finished pieces, illustrated in Figs. 6 and 7, are wire clips used in the manufacture of wire spring beds to bind the bottom rods which hold the spirals in position upon supporting slats.

The main feature of my invention consists of a rigid shaft provided with an axial passageway through which to feed the wire or rod to be worked upon, with a bolster portion in which is mounted a female die, and with a bearing portion on which is mounted a rotatable element operating one or more tools toward the axial line of said shaft.

The minor features of my invention are found in the peculiar adaptation of said tools to their respective functions.

In its present embodiment, my invention consists of a mounting 25, a fixed shaft 9, a cam wheel 1, plungers 6, 7, and 8, a die block 13, a lever 18, feed rolls 19 and 20 and their respective auxiliary elements. The mounting 25 is bored at a height suitable to carry the fixed shaft 9 and is extended to present a face opposite the cam wheel. The fixed shaft 9 is extended to provide a stud for the support and rotation of wheel 1, and the portion of said shaft between its mounting and said wheel 1 is cut away to form a bolster for the reception of a female die. It is also bored, preferably on its axial line, from its outer end to its bolster portion, to permit the feeding of the wire or rods to be worked upon. The cam wheel 1 carries on its outer face a cam way 17, on its inner face the cam ways 3 and 4, and within the recess of the inner face the cam way 5. It is actuated by the driving pinion 2, which is connected with a prime mover. The plungers 6 and 7 are mounted in suitable slide ways 10 upon the face of the mounting 25, and are reciprocated by roller studs 11 extending into the cam ways 3 and 4. The plunger 8 is mounted within a recess of the fixed shaft 9, and is reciprocated in one direction by the cam way 5 and in the other by the springs 16. The die block 13 is mounted within the axial bore of the shaft 9. It also is bored on its axial line and carries the die 14. The lever 18 is mounted upon the auxiliary support for the shaft 9 and intermittently transmits pressure upon the feed roll 20. The feed roll 19 is carried in fixed journals and is actuated by a pulley driven by any suitable means. The feed roll 20 is carried in vertically movable journals, normally held apart from the journals of the feed roll 19 by the springs 21, all of which are mounted in a suitable support opposite the mouth of the die block 13.

In the revolution of the cam wheel 1, the cam way 17 first depresses the lever 18, thereby bringing the feed roll 20 into approximate contact with the feed roll 19 and feeding the rod or wire 15 through the bore of the die block 13, through the die 14, through the open eye of the plunger 6, and over the bolster portion of the shaft 9. The length of feed is regulated by the continuance of pressure by the cam way 17 upon the lever 18. When the wire 15 has been fed into the operating position within the recess 22, the plunger 8 is actuated by the cam way 5, so that in coöperation with the die 14, the wire 15 is cut off. The springs 16 then return the plunger 8 to its initial position. The plunger 6 is then actuated downward by the cam way 3 into the recess 24, carrying the wire 15 down into the recesses 23, doubling said wire upon the blade of the plunger 6, and leaving its two ends projecting above the bolster portion of the shaft 9 a pre-determined distance. At the bottom of its stroke the plunger 6 rests while the plunger 7, which is bifurcated to straddle the plunger 6. is reciprocated by the cam way 4 to bend the two projecting ends of the wire 15. The plunger 7 is then withdrawn, and the completed clip is discharged by the projecting end 12 on the return stroke of the plunger 6.

I do not limit myself to the exact form in which my invention is herein disclosed further than is indicated in the claims which follow.

I claim:

1. A fixed element, an element rotating thereon, and an operating tool; said fixed element being adapted to direct workable material through said rotating element to the operating position, and said rotating element being provided with a driving mechanism for said tool.

2. A fixed element and an element rotating thereon; said fixed element being adapted to direct workable material through said rotating element to the operating position and said rotating element being provided with a cam; and means driven by said cam for operating upon said material.

3. A fixed shaft and a cam disk rotating thereon; said shaft being bored axially to direct workable material through said cam disk; and means driven by said cam disk for operating upon said material.

4. A fixed shaft bored to feed material lengthwise thereof; a cam disk rotating thereon, provided with a cam within its core and a cam on one face thereof; means operated by said internal cam for cutting off material fed therethrough; and an operating tool driven by said external cam.

5. A rotatable element provided with a plurality of cams on one end thereof and a plurality of operating elements driven by said cams in different directions approximately toward the axis of revolution of said rotatable element; one of said operating elements being adapted to straddle the other and to operate on each side thereof.

6. A fixed shaft and a cam disk rotating thereon; said fixed shaft being bored to direct rods through said cam disk; an automatic feed mechanism for said rods controlled by a cam in said disk; and means for operating upon said rods driven by a second cam in said cam disk.

7. A fixed shaft adapted to direct material approximately along its axis; a cam disk rotating thereon; and a reciprocating tool operated by a cam way on one face of said cam disk and moving across the axis of said shaft.

8. A fixed shaft, a cam disk rotating thereon, and a reciprocating tool operated by a cam on one face of said disk; said shaft being bored to direct wire approximately along its axis under said tool and being provided with a female die adapted to coöperate with said tool in forming said wire.

9. A reciprocating element, a female die, means for reciprocating said element into and out of said die, means for feeding rods through said reciprocating element, and means for cutting off a portion thereof lying within said reciprocating element.

10. Means for cutting off wire, a female die, a reciprocating element adapted to bend the wire and thereafter to discharge the bent piece from said die, and a reciprocating mechanism.

11. A fixed element provided with mechanism for feeding workable material therethrough, and further provided with a plurality of tools to operate upon said material at different stages, and an element rotating around said fixed element provided with means for actuating said tools.

WOODFORD SHANNON.

Witnesses:
KATHERINE ARNETT,
LULA L. BALLWEY.

Copies of this patent may be obtained for five cents each, by addressing the "Commissioner of Patents, Washington, D. C."